United States Patent
Yang et al.

(12) United States Patent (10) Patent No.: US 7,257,008 B2
(45) Date of Patent: Aug. 14, 2007

(54) START-UP APPARATUS FOR POWER CONVERTERS

(75) Inventors: Ta-Yung Yang, Milpitas, CA (US); Wei-Hsuan Huang, Taoyuan (TW)

(73) Assignee: System-General Corporation, Taipei (TW)

( * ) Notice: Subject to any disclaimer, the term of this patent is extended or adjusted under 35 U.S.C. 154(b) by 188 days.

(21) Appl. No.: 11/226,272

(22) Filed: Sep. 15, 2005

(65) Prior Publication Data

US 2007/0058398 A1    Mar. 15, 2007

(51) Int. Cl.
H02M 3/335    (2006.01)
H02M 1/00    (2006.01)

(52) U.S. Cl. .................. 363/21.12; 363/20; 363/49; 323/901

(58) Field of Classification Search .................. 363/20, 363/21.12, 21.17, 49, 50; 323/901
See application file for complete search history.

(56) References Cited

U.S. PATENT DOCUMENTS

| | | | |
|---|---|---|---|
| 5,602,724 A | * | 2/1997 | Balakrishnan ........... 363/21.15 |
| 6,865,093 B2 | * | 3/2005 | Disney ...................... 363/21.1 |
| 7,061,780 B2 | * | 6/2006 | Yang et al. .............. 363/21.16 |
| 7,075,802 B2 | * | 7/2006 | Yamashita ............... 363/21.12 |
| 7,102,900 B2 | * | 9/2006 | Disney ..................... 363/21.04 |
| 7,116,564 B2 | * | 10/2006 | Takahashi ............... 363/21.16 |

\* cited by examiner

*Primary Examiner*—Bao Q. Vu
(74) *Attorney, Agent, or Firm*—Rosenberg, Klein & Lee (57) ABSTRACT

A start-up apparatus for a power supply is presented. A charging path from an input voltage to a holding capacitor is cut off after the power converter starts up. The start-up apparatus includes a transistor having a drain supplied with the input voltage, and a source connected to the holding capacitor and an input of a start-up control unit. An output of the start-up control unit controls a switch and the transistor. The holding capacitor starts to be charged as the transistor is turned on. Once a voltage across the holding capacitor exceeds a start-up voltage, an internal control circuit is powered via the switch. Meanwhile, the transistor is turned off and the charging path is cut off. Furthermore, the start-up apparatus provides a hysteresis threshold voltage range for controlling the power converter.

17 Claims, 7 Drawing Sheets

START-UP APPARATUS FOR POWER CONVERTERS

BACKGROUND OF THE INVENTION

1. Field of the Invention

The present invention relates to a start-up apparatus for a power converter. More particularly, the present invention relates to a start-up apparatus having a hysteresis threshold voltage range to control the power converter.

2. Description of Related Art

Figure 1:
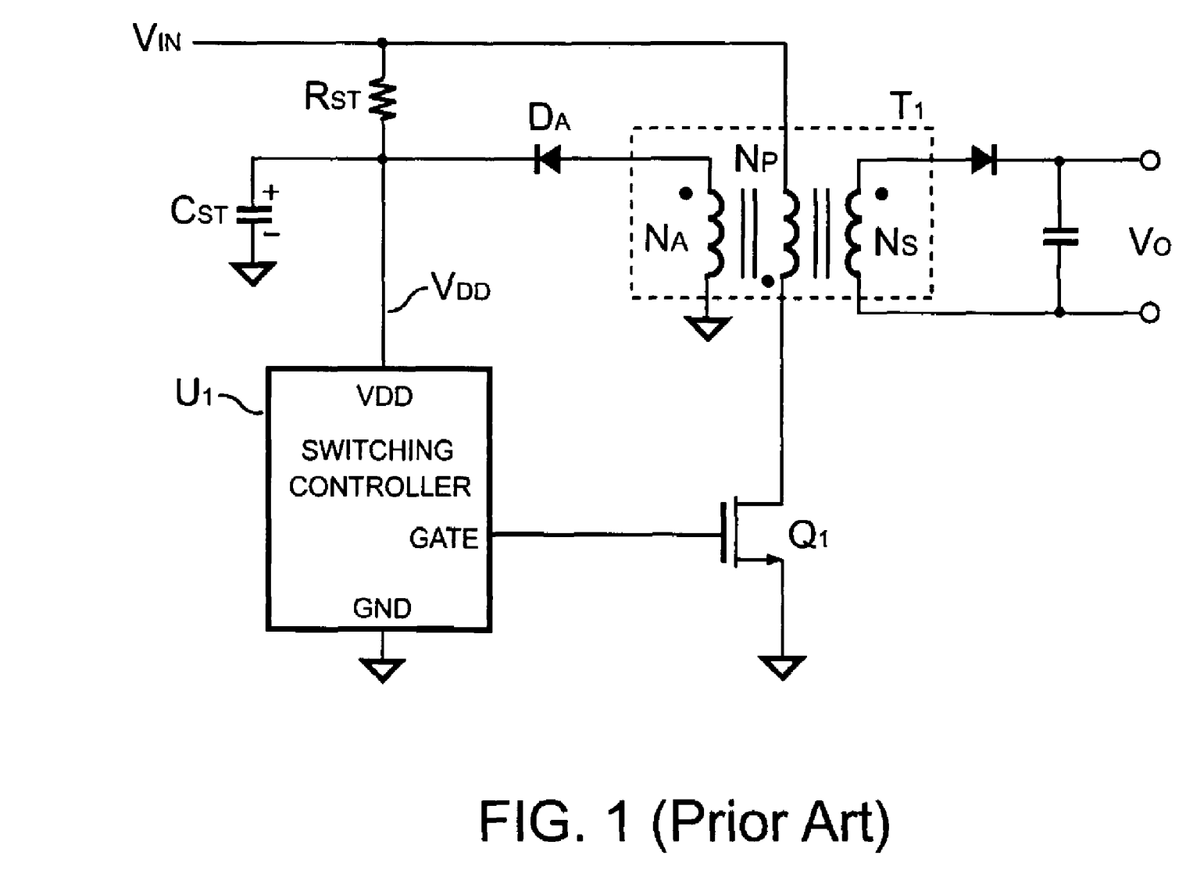
FIG. 1 shows a circuit diagram of a traditional power converter.

FIG. 1 shows a power converter comprising a switching controller $U_1$. The switching controller $U_1$ is utilized to control the power converter for regulating a stable output. However, a supply voltage is needed for powering an internal control circuit. Further referring to FIG. 1, as an input voltage $V_{IN}$ is applied to the power converter, the input voltage $V_{IN}$ will charge up a holding capacitor $C_{ST}$ via a start-up resistor $R_{ST}$. The switching controller $U_1$ will then start to switch a transistor $T_1$ via a power switch $Q_1$. After the power supply is started up, an auxiliary winding $N_A$ of the transformer $T_1$ further powers the switching controller $U_1$ via a diode $D_A$.

The start-up resistor $R_{ST}$ works only for starting up the power converter. After the power converter is started up, the start-up resistor $R_{ST}$ only consumes unnecessary power and becomes redundant. A power consumption $P_R$ of the start-up resistor $R_{ST}$ can be expressed by equation (1).

$$P_R = \frac{(V_{IN} - V_{DD})^2}{R_{ST}} \quad (1)$$

Power-related organizations in the world have set up a series of specification for green-mode power saving. Therefore, it is more desirable for power converter designers to make the start-up resistor $R_{ST}$ open circuit or to provide a solution without the start-up resistor for saving power, especially under no conditions.

SUMMARY OF THE INVENTION

The present invention provides a start-up apparatus for a power converter. A start-up resistor connected between an input voltage and a switching controller is not essential. By cutting off the charging path from the input voltage to a holding capacitor after the power converter starts up, the power consumption can be reduced. Further, the start-up apparatus of the present invention provides a hysteresis threshold voltage range for turning on/off the power converter.

The start-up apparatus comprises a transistor having a drain supplied with the input voltage. A source of the transistor is connected to the holding capacitor and an input of a start-up control unit. An output of the start-up control unit is connected to a gate of the transistor and a control terminal of a switch. The switch further has a first terminal connected to the holding capacitor and a second terminal connected to an internal control circuit. Therefore, as the input voltage drives the transistor on, the holding capacitor is charged up. When a voltage across the holding capacitor exceeds a start-up voltage, the start-up control unit will drive the switch on so as to provide the voltage of the holding capacitor to the internal control circuit. Simultaneously, the transistor is turned off so as to cut off the charging path from the input voltage to the holding capacitor.

The start-up apparatus further comprises a first clamper and a second clamper. The first and second clampers are implemented by zener diodes. The first clamper having a first breakdown voltage and the second clamper having a second breakdown voltage break down successively in response to a voltage increment across the holding capacitor. This provides a first clamping voltage and a second clamping voltage to be the hysteresis threshold voltage range for turning on/off the power converter.

The present invention also provides a start-up apparatus for a power converter. The start-up apparatus is connected to a holding capacitor and is connected to an auxiliary winding of a transformer via a diode. The start-up apparatus is further coupled to an input voltage via a start-up resistor. A start-up control unit of the start-up apparatus has an input connected to the holding capacitor and an output connected to a control terminal of a switch. The switch has a first terminal connected to the holding capacitor and a second terminal connected to an internal control circuit. Therefore, the input voltage charges the holding capacitor via the start-up resistor. As the voltage across the holding capacitor exceeds a start-up voltage, the start-up control unit will turn on the switch. Accordingly, the holding capacitor can power the internal control circuit via the switch.

As described the same above, the start-up apparatus also comprises a first clamper and a second clamper. The first clamper and the second clamper break down successively in response to the voltage increment across the holding capacitor. This provides a first clamping voltage and a second clamping voltage to be the hysteresis threshold voltage range for turning on/off the power converter.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings.

DETAILED DESCRIPTION OF THE INVENTION

Figure 2:
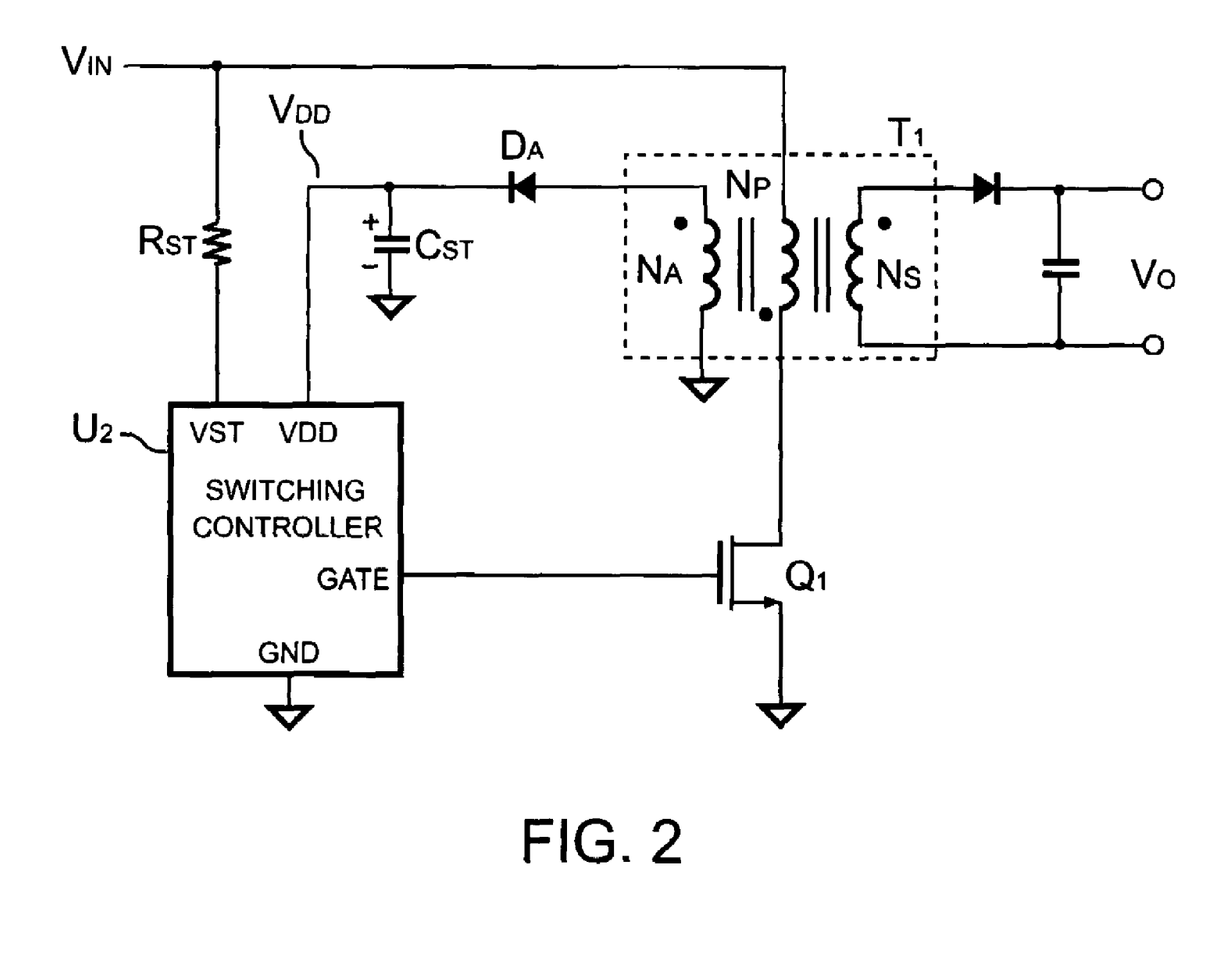
FIG. 2 shows a circuit diagram of a power converter according to the present invention.

FIG. 2 shows a circuit diagram of a power converter according to the present invention. As an input voltage $V_{IN}$ is applied to the power converter, the input voltage $V_{IN}$ will start to charge a holding capacitor $C_{ST}$ via the switching controller $U_2$. As a voltage across the holding capacitor $C_{ST}$ reaches a start-up voltage, the start-up apparatus powers an internal control circuit 90 to switch a transformer $T_1$ on or off via a power switch $Q_1$. Further, a start-up resistor $R_{ST}$ can be inserted between the input voltage $V_{IN}$ and the holding capacitor $C_{ST}$ so as to extend a start-up time of the power converter.

As the switching controller $U_2$ operates, an auxiliary winding $N_A$ of the transformer $T_1$ will charge the holding capacitor $C_{ST}$ via a diode $D_A$ so as to power the switching controller $U_2$. Further, the start-up apparatus will cut off a charging path from the input voltage $V_{IN}$ to the holding capacitor $C_{ST}$ after the power converter is started up. Accordingly, the power consumption of the power converter can be reduced. Moreover, the start-up apparatus provides a hysteresis threshold voltage range for the power converter to turn on/off the power converter.

Figure 3:
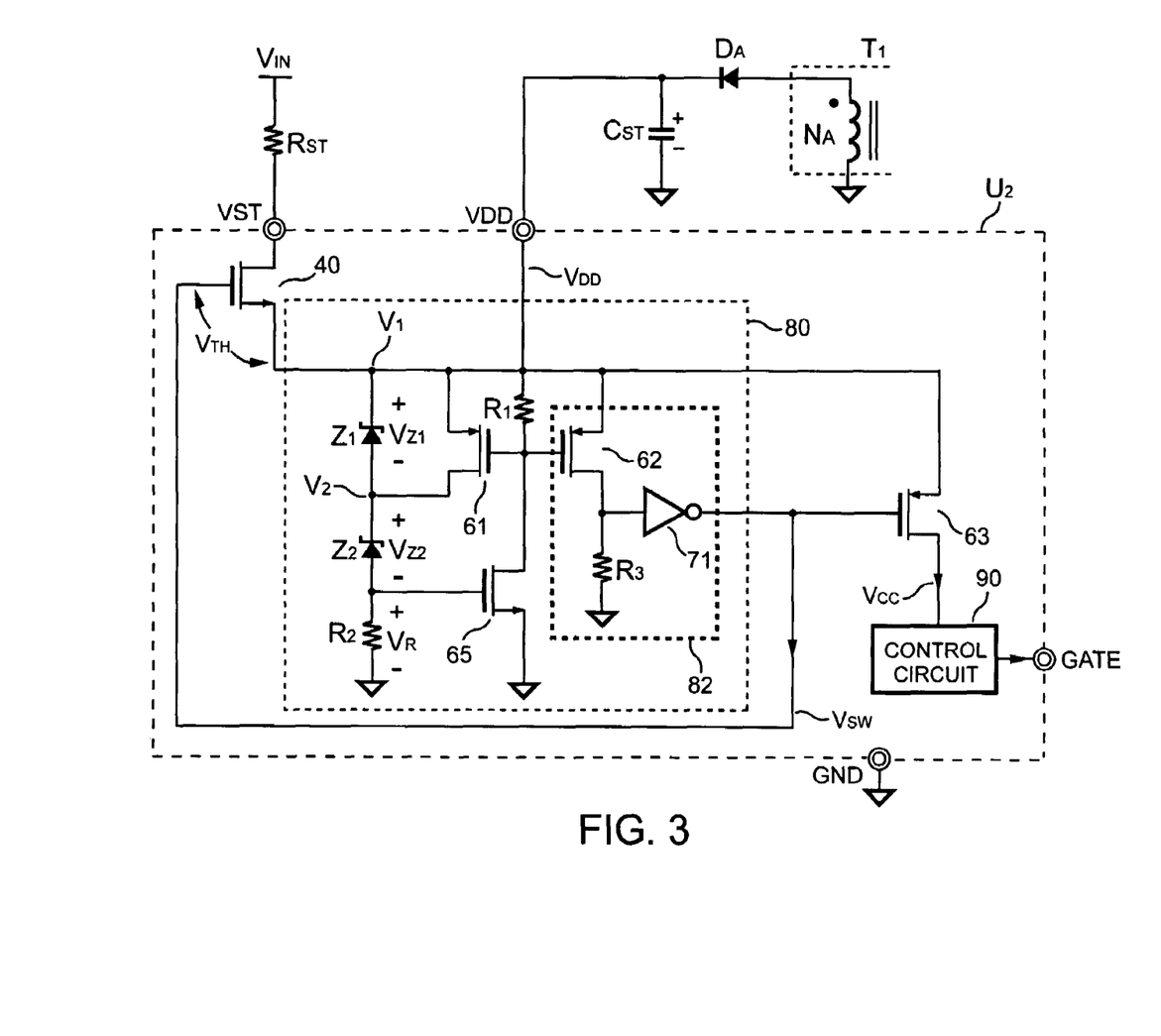
FIG. 3 shows the power converter having a start-up apparatus according to a first embodiment of the present invention.

FIG. 3 shows a circuit diagram of the power converter having the start-up apparatus according to a first embodiment of the present invention. The switching controller $U_2$ provides a supply voltage $V_{CC}$ for powering an internal control circuit 90. According to the present invention, the start-up apparatus is directly connected to the input voltage $V_{IN}$ or connected to the input voltage $V_{IN}$ via a start-up resistor $R_{ST}$. The start-up apparatus is further connected to a holding capacitor $C_{ST}$. The start-up apparatus comprises a transistor 40, a start-up control unit 80 and a switch 63. The transistor 40 is a junction field effect transistor (JFET) having a negative threshold voltage. The transistor 40 is turned off when a gate-to-source voltage is lower than the negative threshold voltage.

Further referring to FIG. 3, the transistor 40 has a source, a gate, and a drain. The drain of the transistor 40 is supplied with the input voltage $V_{IN}$. The source and the gate of the transistor 40 connect to the start-up control unit 80. The start-up control unit 80 comprises a first P-transistor 61 having a source connected to the holding capacitor $C_{ST}$, a gate connected to a buffer circuit 82 and to the holding capacitor $C_{ST}$ via a first resistor $R_1$; a first N-transistor 65 having a drain connected to the gate of the first P-transistor 61, a source connected to a ground reference; a first clamper $Z_1$ having a first terminal connected to the source of the first P-transistor 61 and a second terminal connected to a drain of the first P-transistor 61; and a second clamper $Z_2$ having a first terminal connected to the drain of the first P-transistor 61 and a second terminal connected to a gate of the first N-transistor 65. The second terminal of the second clamper $Z_2$ is further connected to the ground reference via a second resistor $R_2$.

The buffer circuit 82 comprises a second P-transistor 62 having a gate connected to the gate of the first P-transistor 61, a source connected to the holding capacitor $C_{ST}$; a first inverter 71 having an input connected to a drain of the second P-transistor 62 and an output connected to gates of the transistor 40 and the switch 63; and a third resistor $R_3$ connected between the input of the first inverter 71 and the ground reference.

As described above, the first clamper $Z_1$ and the second clamper $Z_2$ are zener diodes having a breakdown voltage $V_{Z1}$ and a breakdown voltage $V_{Z2}$, respectively.

The first clamper $Z_1$ and the second clamper $Z_2$ break down successively in response to a voltage increment across the holding capacitor $C_{ST}$. This provides a first clamping voltage $V_1$ and a second clamping voltage $V_2$ for the hysteresis threshold voltage range of the start-up apparatus of the present invention. The first clamping voltage $V_1$ is also the start-up voltage of the switching controller $U_2$. The first clamping voltage $V_1$ and the second clamping voltage $V_2$ are respectively expressed by following equations (2) and (3):

$$V_1 = V_{Z1+VZ2} + V_R \quad (2)$$

$$V_2 = V_{Z2+VR} \quad (3)$$

Where $V_R$ is a voltage across the second resistor $R_2$.

Referring to FIG. 3, a control terminal of the switch 63 is connected to the output of the buffer circuit 82. A first terminal of the switch 63 is connected to the holding capacitor $C_{ST}$. A second terminal of the switch 63 is connected to the internal control circuit 90. Once the input voltage $V_{IN}$ is applied to the power supply, the transistor 40 of the start-up apparatus is instantly turned on. Therefore, the input voltage $V_{IN}$ starts to charge up the holding capacitor $C_{ST}$. As the voltage across the holding capacitor $C_{ST}$ reaches the first clamping voltage $V_1$, the first clamper $Z_1$ and the second clamper $Z_2$ will break down accordingly. The voltage $V_R$ will be built across the second resistor $R_2$. The voltage $V_R$ therefore turns on the first N-transistor 65. This pulls the gate of the first P-transistor 61, the output of the buffer circuit 82, the control terminal of the switch 63, and the gate of the transistor 40 to the ground reference. Therefore, the first P-transistor 61 and the switch 63 are turned on accordingly.

The transistor 40 is turned off since its gate is connected to the ground reference. A charging path from the input voltage $V_{IN}$ to the holding capacitor $C_{ST}$ is cut off. In such a manner, the power consumption of the power converter can be reduced. The first clamper $Z_1$ is short-circuit while the first P-transistor 61 is turned on. As the switch 63 is turned on, the energy stored in the holding capacitor $C_{ST}$, which is provided from the auxiliary winding $N_A$ of the transformer $T_1$, powers the internal control circuit 90 of the switching controller $U_2$.

Further, while the first clamper $Z_1$ is short-circuit, the internal control circuit 90 will operate normally if the voltage across the holding capacitor $C_{ST}$ remains higher than the second clamping voltage $V_2$. On the contrary, if the voltage across the holding capacitor $C_{ST}$ is lower than the second clamping voltage $V_2$, the second clamper $Z_2$ will not breaks down. This causes the transistor 40 to be turned on and the first P-transistor 61, the switch 63, and the first N-transistor 65 to be turned off. The internal control circuit 90 will not be powered and will operate till the voltage across the holding capacitor $C_{ST}$ reaches the first clamping voltage $V_1$ again.

As described above, the first clamping voltage $V_1$ and the second clamping voltage $V_2$ serve as the hysteresis threshold voltage range for the switching controller $U_2$. That is, the internal control circuit 90 only starts to operate as the voltage across the holding capacitor $C_{ST}$ is higher than the first clamping voltage $V_1$, and stops the operation as the voltage across the holding capacitor $C_{ST}$ is lower than the second clamping voltage $V_2$.

The buffer circuit 82 is controlled by the first N-transistor 65 for turning on the switch 63 and turning off the transistor 40. As the switch 63 is turned on, the internal control circuit 90 is powered by the holding capacitor $C_{ST}$. Meanwhile, as the transistor 40 is turned off, the charging path from the input voltage $V_{IN}$ to the holding capacitor $C_{ST}$ is cut off for reducing power consumption of the power converter.

After the power converter starts up, the first N-transistor 65 will be turned off once the output of the power converter is short-circuit. This could result in the auxiliary winding $N_A$ of the transformer $T_1$ failing to provide energy to the holding capacitor $C_{ST}$ via the diode $D_4$. Since the input of the first inverter 71 is pulled to the ground reference, the first inverter 71 will output a high-level voltage. After the transistor 40 is turned on, the power converter will operate again.

Figure 4:
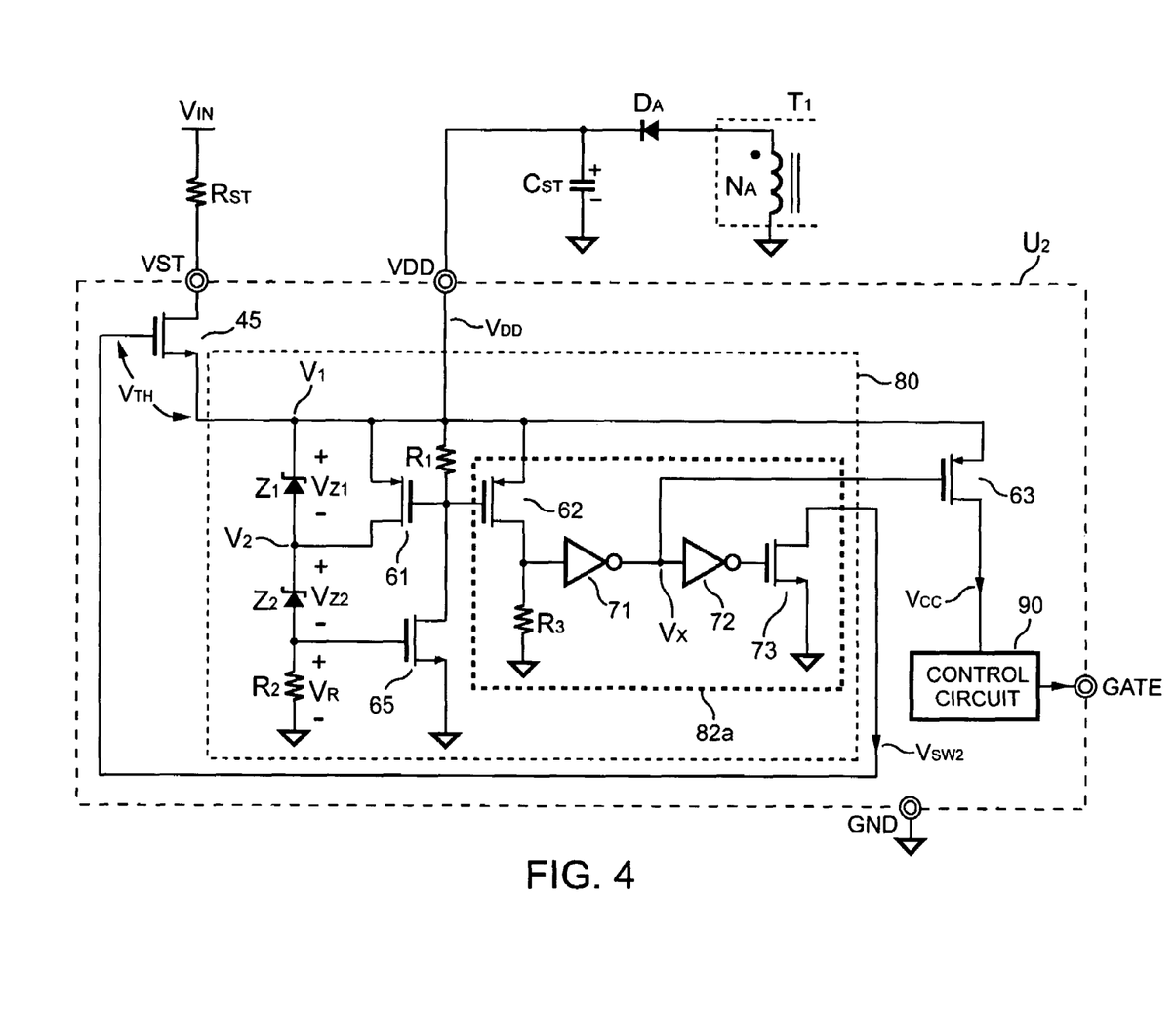
FIG. 4 shows the power converter having the start-up apparatus according to a second embodiment of the present invention.

FIG. 4 shows a circuit diagram of the power converter having the start-up apparatus according to a second embodiment of the present invention. The start-up apparatus comprises a transistor 45, a buffer circuit 82a and a switch 63. The transistor 45 of the second embodiment, which is a metal oxide semiconductor field effect transistor (MOSFET), replaces the transistor 40 of the first embodiment.

The buffer circuit 82a comprises the second P-transistor 62, the first inverter 71, the third resistor $R_3$, a second inverter 72 and a second N-transistor 73. The connection of the second P-transistor 62 and the third resistor $R_3$ in the second embodiment is the same as that in the first embodiment of the invention. An output of the first inverter 71 is connected to an input of the second inverter 72. An output of the second inverter 72 is connected to a gate of the second N-transistor 73. The second N-transistor 73 further has a source connected to the ground reference and a drain connected to a gate of the transistor 45.

Figure 5:
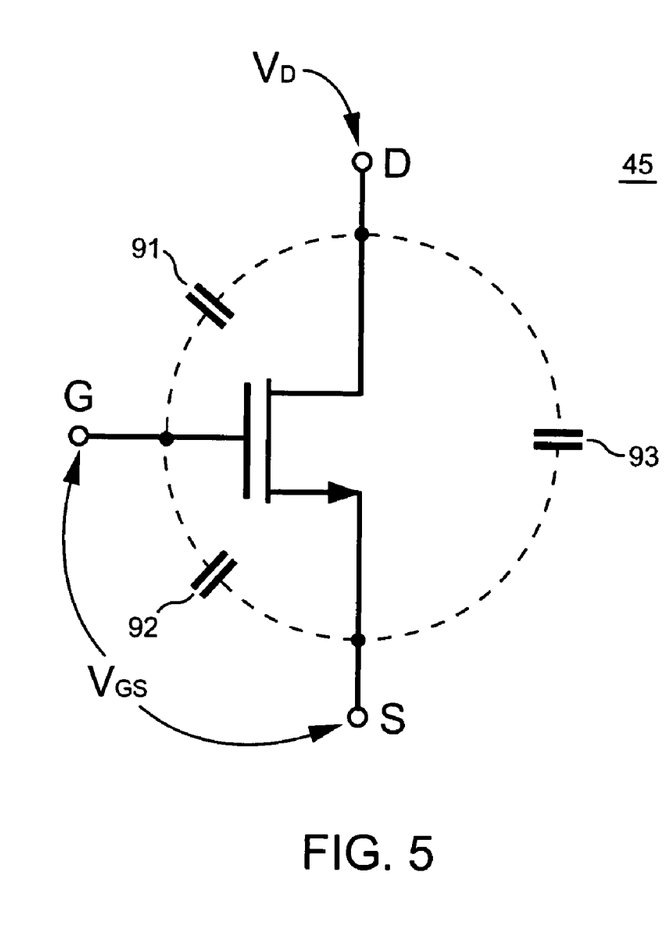
FIG. 5 shows an equivalent circuit diagram illustrating a metal oxide semiconductor transistor having parasitic capacitors.

Now please refer to FIG. 5, wherein an equivalent circuit diagram of the transistor 45 having parasitic capacitors is illustrated. There structurally exist parasitic capacitors between terminals of a MOSFET. A parasitic capacitor 91 is connected between a drain and the gate of the transistor 45. A parasitic capacitor 92 is connected between the gate and a source of the transistor 45. A parasitic capacitor 93 is connected between the drain and the source of the transistor 45. When a voltage $V_D$ is applied to the transistor 45, voltage drops will be formed among the terminals of the transistor 45. A voltage drop $V_{GS}$ between the gate and the source of the MOSFET is given by, $$V_{GS} = \left[ \frac{C_{91}}{C_{91} + C_{92}} \right] \times V_D \quad (4)$$

While the voltage $V_D$ is sufficient large, there will result in a sufficient gate-to-source voltage $V_{GS}$ to drive the transistor 45 on.

Owing to the characteristic of the transistor 45 described above, the input voltage $V_{IN}$ can drive the transistor 45 on to charge up the holding capacitor $C_{ST}$. As the voltage across the holding capacitor $C_{ST}$ reaches the first clamping voltage $V_1$, the first clamper $Z_1$ and the second clamper $Z_2$ will break down and a voltage $V_R$ will be generated across the second resistor $R_2$. The voltage $V_R$ turns on the first N-transistor 65. This turns on the first P-transistor 61, the second P-transistor 62, the switch 63, and the second N-transistor 73. Since the second N-transistor 73 is turned on, the gate of the transistor 45 will be pulled to the ground reference, which turns off the transistor 45. The charging path from the input voltage $V_{IN}$ to the holding capacitor $C_{ST}$ is cut off accordingly so as to save power consumption of the power converter.

Referring to FIG. 4, after the power converter starts up, the first N-transistor 65 is turned off once there is a short-circuit at the output of the power converter. Therefore, the auxiliary winding $N_A$ of the transformer $T_1$ fails to provide energy to the holding capacitor $C_{ST}$. Meanwhile the first N-transistor 65 is turned off and the input of the first inverter 71 is pulled to the ground reference, afterward, the voltages at the output of the first inverter 71, the input of the second inverter 72, and the control terminal of the switch 63 become high. This causes the switch 63 to be turned off and results in a floating connection of the drain of the second N-transistor 73 and the gate of the transistor 45. While the input voltage $V_{IN}$ is continuously applied to the power converter, the power converter will restart to operate.

Figure 6:
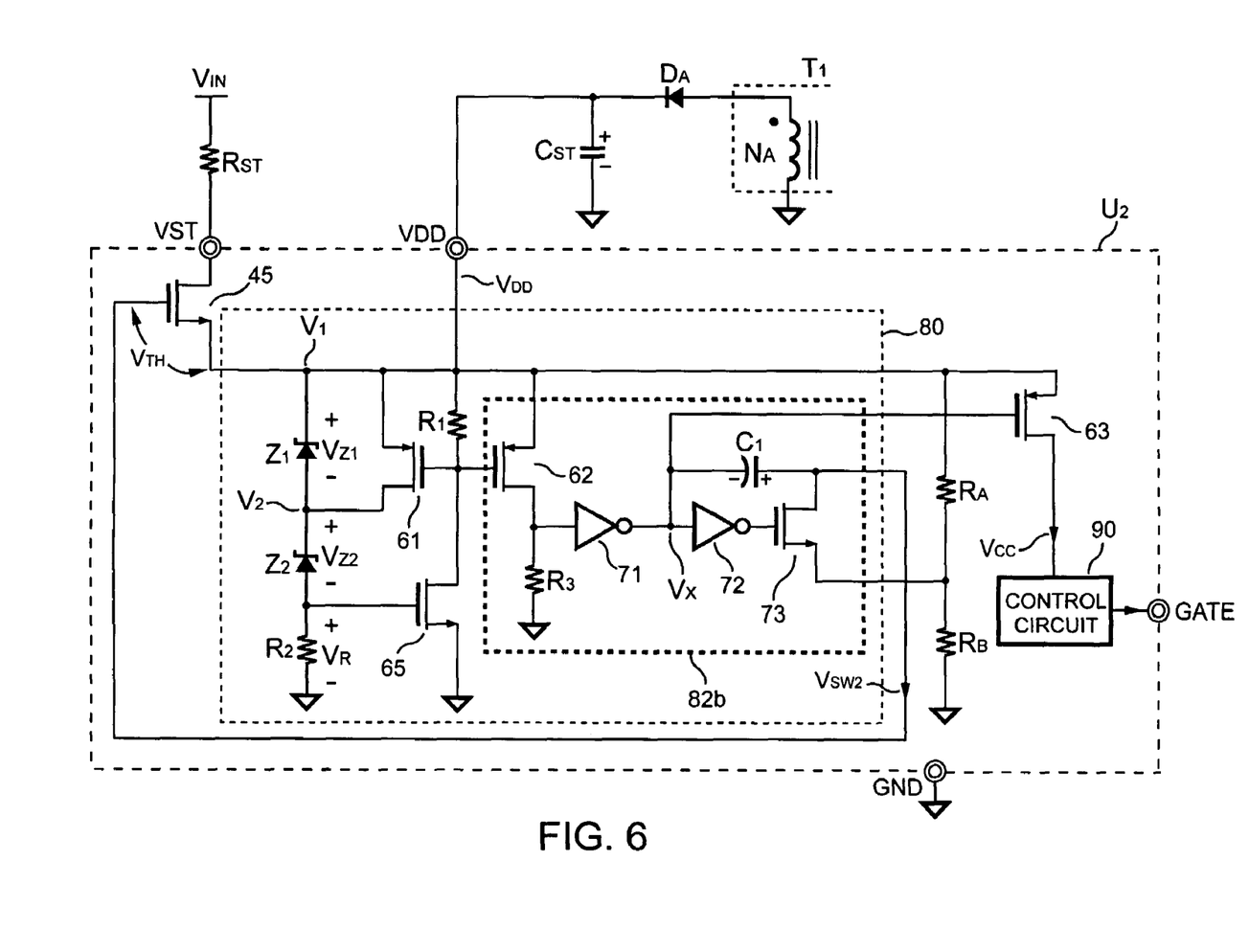
FIG. 6 shows the power converter having the start-up apparatus according to a third embodiment of the present invention.

Referring to FIG. 4, a circuit diagram of the power converter having the start-up apparatus according to a third embodiment of the present invention is illustrated in FIG. 6. A buffer circuit 82b comprises the second P-transistor 62, the first inverter 71, the second inverter 72, the second N-transistor 73, the third resistor $R_3$ and a charge pump capacitor $C_1$. The charge pump capacitor $C_1$ has a positive terminal connected to the gate of the transistor 45 and the drain of the second N-transistor 73. The charge pump capacitor $C_1$ further has a negative terminal connected to the output of the first inverter 71 and the input of the second inverter 72. A voltage divider formed by resistors $R_A$ and $R_B$ further connects to the source of the second N-transistor 73. The voltage divider is connected between the first terminal of the switch 63 and the ground reference. A junction of resistors $R_A$ and $R_B$ is further connected to the source of the second N-transistor 73.

Further referring to FIG. 6, the input voltage $V_{IN}$ drives the transistor 45 on to charge up the holding capacitor $C_{ST}$. This results in a low-level driving voltage $V_X$ at the output of the first inverter 71. The second inverter 72 will then turn on the second N-transistor 73. The voltage across the holding capacitor $C_{ST}$ is coupled to the voltage divider in parallel. Moreover, since the second N-transistor 73 is turned on, voltages at the source of the second N-transistor 73, the drain of the second N-transistor 73, and the gate of the transistor 45 will be equal to a junction voltage at the junction of resistors $R_A$ and $R_B$. The junction voltage will start to charge up the charge pump capacitor $C_1$. In the meantime, the voltage at the gate of the transistor 45 is lower than the voltage at the source of the transistor 45. This turns off the transistor 45 and therefore cuts off the charging path from the input voltage $V_{IN}$ to the holding capacitor $C_{ST}$ for reducing power consumption of the power converter.

In FIG. 6, once there is a short-circuit at the output of the power converter, the auxiliary winding $N_A$ of the transformer $T_1$ is unable to charge the holding capacitor $C_{ST}$ via the diode $D_4$. This causes the first N-transistor 65 to be turned off, and makes the first inverter 71 output a high-level driving voltage $V_X$. The second N-transistor 73 will be turned off. The driving voltage $V_X$ adds up the voltage across the charge pump capacitor $C_1$ to turn on the transistor 45. Accordingly, the power converter operates again.

Figure 7:
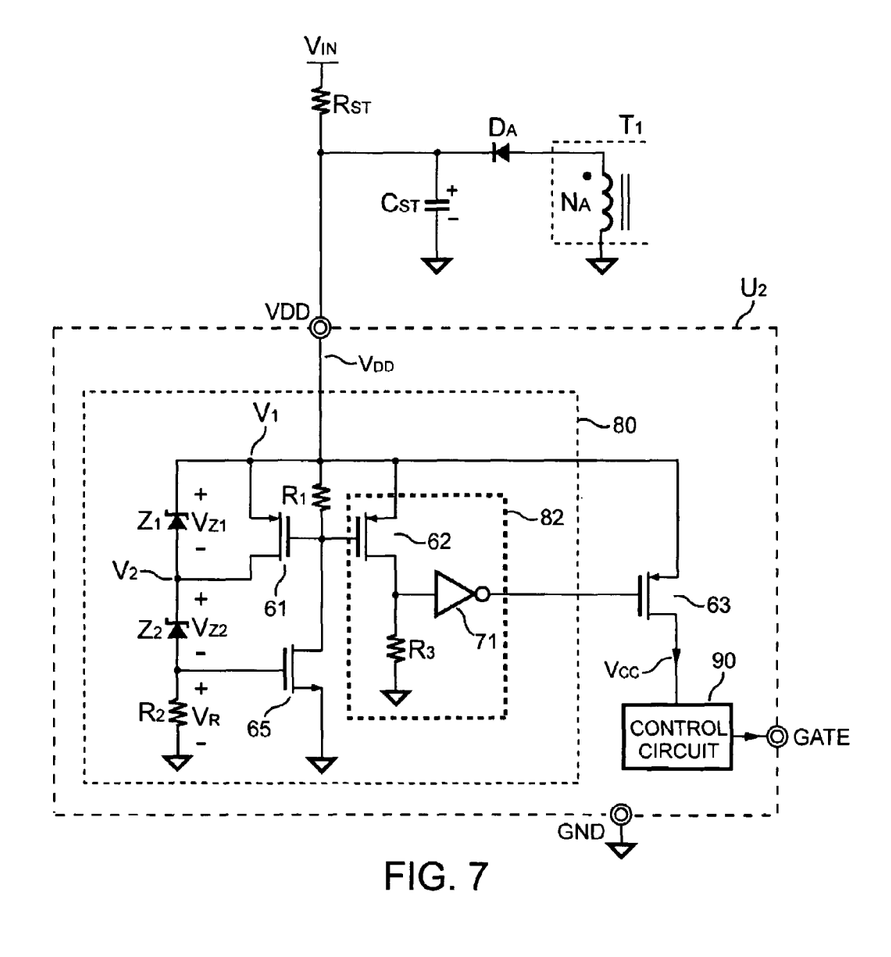
FIG. 7 shows the power converter having the start-up apparatus according to a fourth embodiment of the present invention.

Referring to FIG. 3, and a circuit diagram of the power converter having the start-up apparatus according to a fourth embodiment of the present invention is illustrated in FIG. 7. This embodiment is implemented by removing the transistor 40 in the first embodiment of the present invention. A first terminal of the start-up resistor $R_{ST}$ is supplied with the input voltage $V_{IN}$ and a second terminal of the start-up resistor $R_{ST}$ is connected to the holding capacitor $C_{ST}$ to build a RC charge/discharge circuit. The rest operation is the same as that in the first embodiment of the present invention and will be described as follows.

As the input voltage $V_{IN}$ is applied to the power converter, the holding capacitor $C_{ST}$ will be charged up. When the voltage across the holding capacitor $C_{ST}$ exceeds a start-up voltage, the first clamper $Z_1$ and the second clamper $Z_2$ will break down successively and a voltage $V_R$ will be built across the second resistor $R_2$. The voltage $V_R$ turns on the first N-transistor 65, therefore, the gate of the first P-transistor 61, the output of the buffer circuit 82, and the control terminal of the switch 63 will be pulled to the ground reference. This turns on the first P-transistor 61 and the switch 63. Since the first P-transistor 61 is turned on, the first clamper $Z_1$ is short circuit. While the switch 63 is turned on, energy provided from the auxiliary winding $N_A$ of the transformer $T_1$ to the holding capacitor $C_{ST}$ powers the internal control circuit 90.

Further referring to FIG. 7, the buffer circuit 82 comprises a second P-transistor 62 having a gate connected to the gate of the first P-transistor 61 and the source connected to the holding capacitor $C_{ST}$; a first inverter 71 having an input connected to a drain of the second P-transistor 62 and an output connected to a control terminal of the switch 63; and a third resistor $R_3$ having a first terminal connected to the drain of the second P-transistor 62 and a second terminal connected to the ground reference.

While the first clamper $Z_1$ is short-circuit, the internal control circuit 90 operates normally if the voltage across the holding capacitor $C_{ST}$ is higher than the second clamping voltage $V_2$. On the contrary, if the voltage across the holding capacitor $C_{ST}$ is lower than the second clamping voltage $V_2$, the second clamper $Z_2$ will not break down anymore. This turns off the first P-transistor 61, the switch 63, and the first N-transistor 65. Accordingly, the internal control circuit 90 will stop operation. The power converter will restart to operate as the voltage across the holding capacitor $C_{ST}$ exceeds the start-up voltage.

As described above, the first clamping voltage $V_1$ and the second clamping voltage $V_2$ provide a hysteresis threshold voltage range. That is, the internal control circuit 90 only operates as the voltage across the holding capacitor $C_{ST}$ is higher than the first clamping voltage $V_1$ and only stops operation when the voltage across the holding capacitor $C_{ST}$ is lower than the second clamping voltage $V_2$.

The buffer circuit 82 operates in response to the switching of the first N-transistor 65. While the buffer circuit 82 turns on the switch 63, the energy in the holding capacitor $C_{ST}$ provided from the auxiliary winding $N_A$ of the transformer $T_1$ is able to power the internal control circuit 90.

In short, after the power converter starts to operate, the start-up apparatus cuts off the charging path from the input voltage $V_{IN}$ to the holding capacitor $C_{ST}$ for saving power consumption of the power converter. Meanwhile, the power consumption under the condition without power loading can be improved to meet the green-mode specification. The start-up apparatus also provides a hysteresis threshold voltage range for turning on/off the power converter.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A start-up apparatus for starting up a power converter, which is supplied with an input voltage and is connected to a holding capacitor, comprising:
    a transistor, having a source, a gate and a drain, said drain of said transistor is supplied with said input voltage, said source of said transistor being connected to said holding capacitor;
    a start-up control unit, having an input and an output, said input of said start-up control unit being connected to said holding capacitor and said source of said transistor, said output of said start-up control unit being connected to said gate of said transistor; and
    a switch, connected to said output of said start-up control unit and said holding capacitor, wherein said input voltage drives said transistor on and charges said holding capacitor, wherein said start-up control unit draws a start-up voltage from said holding capacitor to drive on said switch and to provide a voltage across said holding capacitor for a control circuit, wherein said start-up control unit also turns off said transistor to cut off a charging path from said input voltage to said holding capacitor.

2. The start-up apparatus as claimed in claim 1, said transistor is a junction field effect transistor.

3. The start-up apparatus as claimed in claim 2, said start-up apparatus further comprising a start-up resistor, said start-up resistor having a first terminal supplied with said input voltage and a second terminal connected to said drain of said transistor.

4. The start-up apparatus as claimed in claim 2, said start-up control unit comprising:
    a first p-transistor, having a source connected to said holding capacitor and said source of said transistor, said first p-transistor further having a gate connected to said holding capacitor via a first resistor;
    a first n-transistor, having a drain connected to said gate of said first p-transistor, said first n-transistor further having a source connected to a ground reference;
    a first clamper, connected between a drain and said source of said first p-transistor;
    a second clamper, connected between said drain of said first p-transistor and a gate of said first n-transistor, wherein said gate of said first n-transistor is connected to said ground reference via a second resistor; and
    a buffer circuit, connected to said drain of said first n-transistor, said holding capacitor, a control terminal of said switch, and said gate of said transistor, said buffer circuit operating in response to a switching of said first n-transistor.

5. The start-up apparatus as claimed in claim 4, wherein said first clamper and said second clamper break down successively in response to a voltage increment across said holding capacitor, wherein said first clamper and said second clamper respectively generate a first clamping voltage and a second clamping voltage so as to provide a hysteresis threshold voltage range.

6. The start-up apparatus as claimed in claim 4, said buffer circuit comprising:
    a second p-transistor having a gate connected to said gate of said first p-transistor, said second p-transistor further having a source connected to said holding capacitor, said source of said transistor and a first terminal of said switch;
    a first inverter, having an input connected to a drain of said second p-transistor, said first inverter further having an output connected to said control terminal of said switch and said gate of said transistor; and
    a third resistor, connected between said drain of said second p-transistor and said ground reference.

7. The start-up apparatus as claimed in claim 1, said transistor is a metal oxide semiconductor transistor.

8. The start-up apparatus as claimed in claim 7, said start-up apparatus further comprising a start-up resistor, said start-up resistor having a first terminal supplied with said input voltage, said start-up resistor further having a second terminal connected to said drain of said transistor;

9. The start-up apparatus as claimed in claim 7, said start-up control unit comprising:

a first p-transistor, having a source connected to said holding capacitor and said source of said transistor, said first p-transistor further comprising a gate connected to said holding capacitor via a first resistor;

a first n-transistor, having a drain connected to said gate of said first p-transistor, said first n-transistor further comprising a source connected to a ground reference;

a first clamper, connected between a drain and said source of said first p-transistor;

a second clamper, connected between said drain of said first p-transistor and a gate of said first n-transistor, wherein said gate of said first n-transistor is connected to said ground reference via a second resistor; and a buffer circuit, connected to said drain of said first n-transistor, said holding capacitor, a control terminal of said switch, and said gate of said transistor, said buffer circuit operating in response to a switching of said first n-transistor.

10. The start-up apparatus as claimed in claim 9, wherein said first clamper and said second clamper break down successively in response to a voltage increment across said holding capacitor, wherein said first clamper and said second clamper respectively generate a first clamping voltage and a second clamping voltage to provide a hysteresis threshold voltage range.

11. The start-up apparatus as claimed in claim 9, said buffer circuit comprising:

a second p-transistor, having a gate connected to said gate of said first p-transistor, said second p-transistor further having a source connected to said holding capacitor, said source of said transistor and said first terminal of said switch;

a first inverter, having an input connected to a drain of said second p-transistor, said first inverter further having an output connected to said control terminal of said switch;

a third resistor, connected between said drain of said second p-transistor and said ground reference;

a second inverter, having an input connected to said output of said first inverter; and a second n-transistor, having a source connected to said ground reference, a drain connected to said gate of said transistor, and a gate connected to an output of said second inverter.

12. The start-up apparatus as claimed in claim 9, said buffer circuit comprising:

a second p-transistor, having a gate connected to said gate of said first p-transistor, said second p-transistor further having a source connected to said holding capacitor, said source of said transistor and said first terminal of said switch;

a first inverter, having an input connected to a drain of said second p-transistor, said first inverter further having an output connected to said control terminal of said switch;

a third resistor, connected between said drain of said second p-transistor and said ground reference;

a second inverter, having an input connected to said output of said first inverter;

a second n-transistor, having a source connected to said holding capacitor via a voltage divider, a drain connected to said gate of said transistor, and a gate connected to an output of said second inverter; and a charge pump capacitor, having a positive terminal connected to said gate of said transistor and said drain of said second n-transistor, said charge pump capacitor further having a negative terminal connected to said output of said first inverter and said input of said second inverter.

13. The start-up apparatus as claimed in claim 12, said charge pump capacitor being utilized to accelerate turning on said transistor.

14. A start-up apparatus for starting up a power converter, which is supplied with an input voltage via a start-up resistor and is connected to a holding capacitor and an auxiliary winding, comprising:

a start-up control unit, having an input and an output, said input of said start-up control unit being connected to said holding capacitor; and a switch, connected to said holding capacitor and said output of said start-up control unit, said input voltage charging said holding capacitor via said start-up resistor, wherein said start-up control unit draws a start-up voltage from said holding capacitor to drive said switch on, therefore a voltage across said holding capacitor powers a control circuit via said switch.

15. The start-up apparatus as claimed in claim 14, said start-up unit comprising:

a first p-transistor, having a source connected to said holding capacitor and a first terminal of said switch, said first p-transistor further having a gate connected to said holding capacitor via a first resistor;

an n-transistor, having a drain connected to said gate of said first p-transistor, said n-transistor further having a source connected to a ground reference;

a first clamper, connected to said source and a drain of said first p-transistor;

a second clamper, having a first terminal connected to said drain of said first p-transistor, said second clamper further having a second terminal connected to a gate of said n-transistor, said gate of said n-transistor being connected to said ground reference via a second resistor; and a buffer circuit, connected to said drain of said n-transistor, said holding capacitor, and a control terminal of said switch, said buffer circuit operating in response to a switching of said n-transistor.

16. The start-up apparatus as claimed in claim 15, said first clamper and said second clamper break down successively in response to the voltage increment across said holding capacitor, wherein said first clamper and said second clamper respectively generate a first clamping voltage and a second clamping voltage so as to provide a hysteresis threshold voltage range.

17. The start-up apparatus as claimed in claim 15, said buffer circuit comprising:

a second p-transistor, having a gate connected to said gate of said first p-transistor, said second p-transistor further having a source connected to said holding capacitor and said first terminal of said switch;

an inverter, having an input connected to a drain of said second p-transistor, said inverter further having an output connected to said control terminal of said switch; and a third resistor, connected between said drain of said second p-transistor and said ground reference.

* * * * *